US006107572A

United States Patent [19]

Miyazaki

[11] Patent Number: 6,107,572

[45] **Date of Patent: *Aug. 22, 2000**

[54] TERMINAL-PROCESSED STRUCTURE OF SHIELDED CABLE AND TERMINAL-PROCESSING METHOD OF THE SAME

[75] Inventor: Sho Miyazaki, Yokkaichi, Japan

[73] Assignee: Sumitomo Wiring Systems, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/225,586

[22] Filed: Jan. 6, 1999

Related U.S. Application Data

[63] Continuation-in-part of application No. 08/911,277, Aug. 14, 1997, which is a continuation-in-part of application No. 08/799,510, Feb. 12, 1997, abandoned, which is a continuation of application No. 08/466,077, Jun. 6, 1995, abandoned.

[30] Foreign Application Priority Data

Jul. 29, 1994 [JP] Japan .................................... 6-197963

[51] Int. Cl.[7] .................................................... H02G 15/06

[52] U.S. Cl. ........................................... 174/75 C; 439/98

[58] Field of Search ............................... 174/74 R, 75 C, 174/78, 84 C; 439/98, 99, 100, 578, 610, 877, 882

[56] References Cited

U.S. PATENT DOCUMENTS

| | | | |
|---|---|---|---|
| 2,941,028 | 6/1960 | Edlen et al. | 174/75 C |
| 3,828,298 | 8/1974 | Schumacher | 174/75 C X |
| 3,835,241 | 9/1974 | Masterson et al. | 174/84 C X |
| 4,583,069 | 4/1986 | Pierce | 174/84 C X |
| 5,180,316 | 1/1993 | Miller et al. | 439/610 |
| 5,402,315 | 3/1995 | Reichle | 439/100 X |
| 5,432,301 | 7/1995 | Gehring | 174/78 |

*Primary Examiner*—Kristine Kincaid
*Assistant Examiner*—Chau N. Nguyen
*Attorney, Agent, or Firm*—Bierman, Muserlian and Lucas

[57] ABSTRACT

A terminal-processed structure of a shielded cable is so simple that the shielded cable becomes easy for use. In a shielded cable, core wires covered by a first insulating layer are sheathed by braided metallic wires on the outer periphery thereof and are further covered by a second insulating layer on the braided metallic wires. The braided metallic wires are exposed at one end of the shielded cable. A hard sleeve-like body is inserted beneath the exposed, braided metallic wires. A conductive sleeve-like body is crimped onto the exposed, braided metallic wires on the one end of the shielded cable. The conductive sleeve-like body crimped on the one end of the shielded cable is attached to a conductive casing by a conductive band or ring when the shielded cable is used. Thus, the braided metallic wires are electrically communicated with the casing.

3 Claims, 10 Drawing Sheets

TERMINAL-PROCESSED STRUCTURE OF SHIELDED CABLE AND TERMINAL-PROCESSING METHOD OF THE SAME

This application is a Continuation-in-part of application Ser. No. 08/911,277, filed Aug. 14, 1997, which is a Continuation-in-part of application Ser. No. 08/799,510, filed Feb. 12, 1997 now abandoned, which is a Continuation of application Ser. No. 08/466,077, filed Jun. 6, 1995 now abandoned, which claims the priority of Japanese Application 197963/1994, filed Jul. 29, 1994.

BACKGROUND OF THE INVENTION (1) Field of the Invention

This Invention relates to a terminal-processed structure of a shielded cable and a terminal-processing method of the shielded cable.

(2) Statement of the Prior Art

Heretofore, an example of a terminal-processed structure of a shielded cable is disclosed in Japanese Patent Public Disclosure No. Hei 2-273427 (1990). For convenience of explanation, a conventional terminal-processed structure of a shielded cable will be described by referring to FIGS. 8 to 10. FIGS. 8 to 10 are illustrating the respective steps of processing a terminal of the shielded cable.

As shown in FIG. 8, a conventional shielded cable 1 comprises two cores 2, braided metallic wires 3 sheathing the cores and an outer insulating member 4 covering the wires 3. An inner sleeve 6 which is provided with male threads is disposed on the outer insulating member 4 of the shielded cable 1.

As shown in FIG. 9, the braided metallic wires 3 are bent back on the inner sleeve 6 and core wires 5*a* of an external electrical cable 5 are placed on the braided metallic wires 3. Then, as shown in FIG. 10, an outer sleeve 7 which is provided with female threads is engaged with the inner sleeve 6.

In a conventional method of processing the terminal of the shielded cable, it is necessary to connect the terminal of the external electrical cable 5 to the braided metallic wires 3 of the shielded cable 1, since the braided metallic wires 3 must be electrically connected to an external conductive element through the cable 5. This requires much work. Moreover, work to interconnect the inner sleeve 6 and the outer sleeve 7 is required. This makes it difficult to automate terminal-processing.

SUMMARY OF THE INVENTION

An object of the present Invention is to provide a terminal-processed structure of a shielded cable which is simple and suitable for rapid and reliable processing of a terminal.

Another object of the present Invention is to provide a method for processing a terminal of a shielded cable in which the terminal is simple and suitable for rapid and reliable processing.

In order to achieve the first object, in a terminal-processed structure of a shielded cable in accordance with the present Invention, core wires covered by a first insulating layer are sheathed by braided metallic wires on the outer periphery thereof and are further covered by a second insulating layer on the braided metallic wires. The braided metallic wires are exposed at one end of the shielded cable. A hard sleeve-like body is inserted beneath the exposed, braided metallic wires. A conductive sleeve-like body is crimped on the exposed, braided metallic wires on the one end of the shielded cable.

The hard sleeve-like body may be inserted between the first insulating layer and the exposed, braided metallic wires, or between the exposed, braided metallic wires bent back above the second insulating layer and the second insulating layer.

The conductive sleeve-like body is a U-shaped metallic strip at first when the body is placed on the exposed, braided metallic wires on the one end of the shielded cable, and then the strip is formed into the sleeve-like body when the strip is crimped on the metallic wires.

The hard sleeve-like body may be made of an insulative plastic material or a conductive metallic material.

The hard sleeve-like body may be provided with a plurality of circumferential grooves in the outer periphery thereof or may be provided with an enlarged portion at the opposite ends thereof and has a length slightly longer than the width of the conductive sleeve-like body.

In order to easily insert the hard sleeve-like body beneath the exposed, braided metallic wires, the hard sleeve-like body may comprise a pair of half parts divided axially or may be provided with a slit extending axially.

In order to achieve the above second object, in a method of processing a terminal of a shielded cable in accordance with the present Invention, core wires covered by a first insulating layer are sheathed by braided metallic wires on the outer periphery thereof and are further covered by a second insulating layer on the braided metallic wires. The method includes the steps of: exposing said braided metallic wires at one end of said shielded cable; inserting a hard sleeve-like body beneath the exposed, braided metallic wires; and crimping a conductive sleeve-like body on the exposed, braided metallic wires on the one end of the shielded cable.

In the case that the shielded cable is used, the conductive sleeve-like body crimped on the one end of the shielded cab attached to a conductive casing by a conductive band or ring. Thus, the braided metallic wires 13 are electrically communicated with the casing.

In the terminal-processed structure of the shielded cable as constructed above, the hard sleeve-like body is inserted beneath the braided metallic wires after the wires are exposed at one end of the shielded cable, so that the body serves to support the exposed, braided metallic wires, and the conductive sleeve-like body is put on the braided metallic wires bent back on the second insulating layer and crimped onto the metallic wires, thereby electrically communicating and holding the conductive sleeve-like body with and on the exposed, braided metallic wires. In order to electrically communicate the braided metallic wires with an external conductive element, the conductive sleeve-like body is brought into contact with a casing or the like when the shielded cable is secured to the casing.

Also, since the conductive sleeve-like body is formed into a U-shaped configuration at first, the shielded cable can be easily inserted into the sleeve-like body through an opening between legs of the U-shaped strip. Afterward, the U-shaped strip is crimped on the braided metallic wires.

Further, in the method of processing the terminal of the shielded cable, the hard sleeve-like body is inserted beneath the braided metallic wires after the wires are exposed at one end of the shielded cable, so that the body serves to support the exposed, braided metallic wires, and the conductive sleeve-like body is put on the braided metallic wires bent on the second insulating layer and crimped onto the metallic wires, thereby electrically communicating and holding the conductive sleeve-like body with and on the exposed, braided metallic wires.

As described above, according to the present Invention, it is possible to easily insert the hard sleeve-like body beneath the exposed, braided metallic wires and to readily mount the conductive sleeve-like body on the braided metallic wires merely by crimping the body on the wires. Thus, it is possible to extremely easily effect the terminal processing. Also, electrical communication between the conductive sleeve-like body and the braided metallic wires can be positively obtained.

Since the U-shaped metallic strip can be easily put on the shielded cable, an efficiency of processing work can be enhanced.

Moreover, in the method of the present Invention, a simple work can be obtained merely by inserting the hard sleeve-like body beneath the exposed, braided metallic wires and by crimping the conductive sleeve-like body onto the exposed, braided metallic wires.

DETAILED DESCRIPTION OF THE PREFERRED EMBODIMENTS

Figure 1:
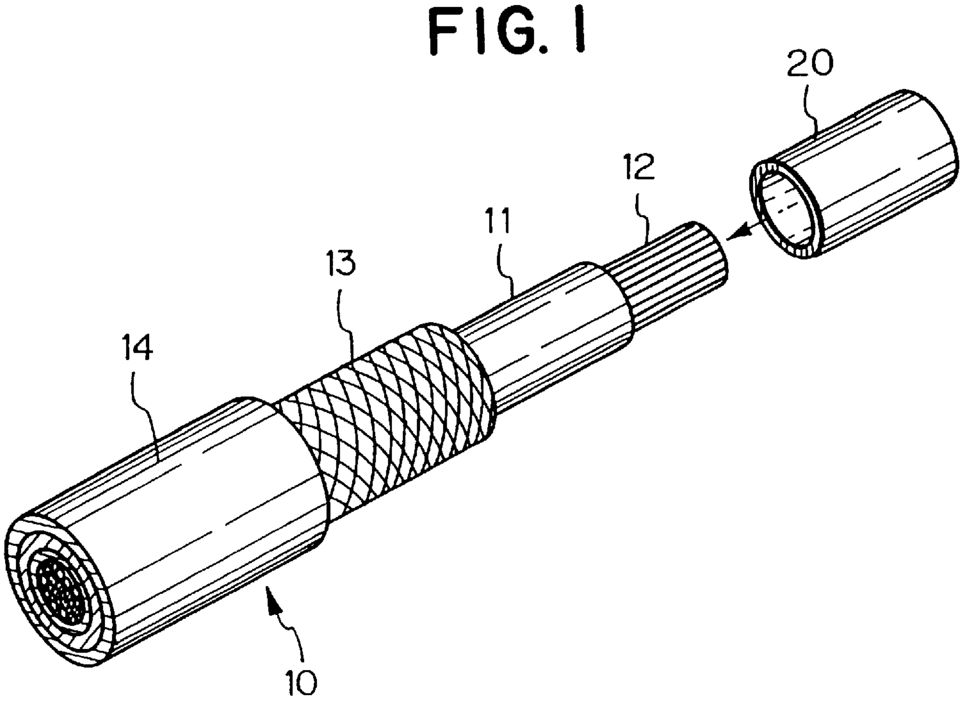
FIG. 1 is a perspective view of an end of a shielded cable, illustrating a step of processing a terminal of the cable in an embodiment of the present Invention.

By referring now to the drawings, embodiments of the present Invention will be explained below.

FIGS. 1 to 4 are perspective views of an end of each shielded cable of a first embodiment in accordance with the present Invention. A shielded cable 10 comprises core wires 12, a first insulating layer or an insulating member 11 which covers the core wires 12 on the outer periphery, braided metallic wires 13 which sheathe the first insulating member 11, and a second insulating layer or an outer jacket 14 which covers the braided metallic wires 13. A hard sleeve-like body or a plastic sleeve 20 is made of an insulating hard plastic material and has an inner diameter sufficient to receive the core wires 10 covered by the first insulating layer 11. The plastic sleeve 20 has a hardness enough to bear a crimping force on a conductive sleeve-like body or a U-shaped metallic strip 30 described hereinafter. Although the hard sleeve-like body 20 is made of an insulating hard plastic material in this embodiment, the body 20 may be made of a metallic material. It is for the reason that the sleeve 20 merely serves to support the braided metallic wires 13 and need not communicate electrically with the braided wires.

Figure 2A:
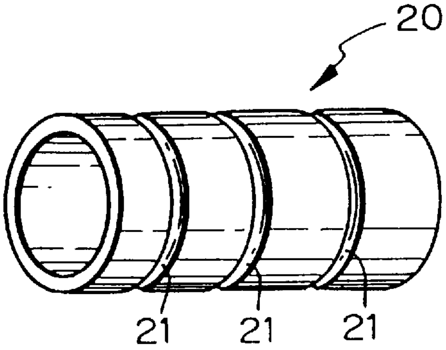
FIGS. 2A to 2D are perspective views of various types of plastic sleeves to be used in a terminal-processed structure of the present Invention.
Figure 2B:
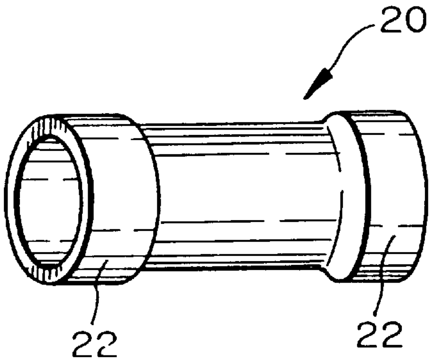
Figure 2C:
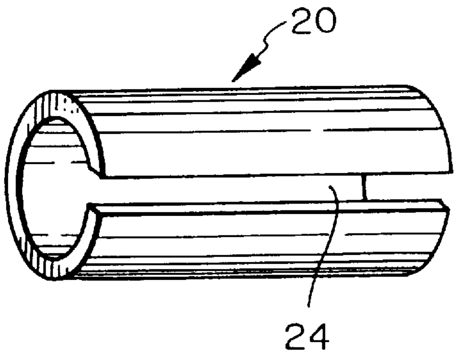
Figure 2D:
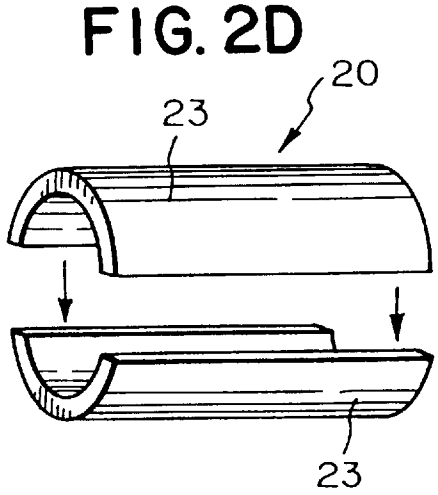

In order to prevent the sleeve from coming out of the shielded cable 10, the plastic sleeve 20 may be provided with a plurality of circumferential grooves 21 on its outer periphery so that the metallic wires 13 and strip 30 bite into the grooves 21 when the strip 30 is crimped onto the wires 13, as shown in FIG. 2A. Also, as shown in FIG. 2B, the plastic sleeve 20 is provided with an enlarged portion 22 at its opposite ends and has a length slightly longer than the width of the metallic strip 30 so that the metallic wires 13 and the strip 30 enter into a recess defined between the enlarged portions 22 when the metallic strip 30 is crimped onto the metallic wires 13. Thus, the sleeve 20 is prevented from coming out of the shielded cable 10.

Although the plastic sleeve 20 is formed into a complete cylindrical body from the beginning in the above embodiment, the plastic sleeve 20 may comprise a pair of half parts 23, 23 divided axially (FIG. 2D) or may be provided with a slit 24 extending axially (FIG. 2C), since the sleeve 20 can be brought into a complete sleeve from when it is assembled on the shielded cable 10, thereby simplifying the step of mounting the sleeve 20 on the cable 10.

The metallic strip or conductive sleeve-like body 30 is a U-shaped conductive metallic strip at first. The metallic strip 30 has a length slightly larger than the circumference of the plastic sleeve 20 and a width of span between the legs of U-shape which is enough to receive the sleeve 20. Although the metallic strip 30 is formed into a U-shaped configuration at first in this embodiment, the metallic strip may be formed into a complete sleeve or a substantially annular body made of a steel strip.

Next, an operation of the above embodiment of the terminal-processed structure of the shielded cable will be explained below.

Figure 3:
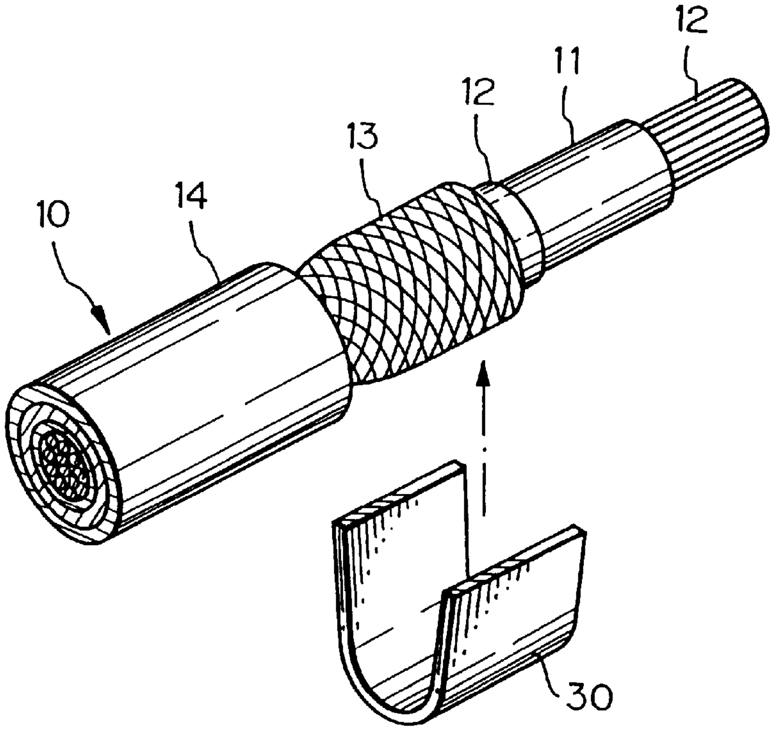
FIG. 3 is a perspective view of an end of the shielded cable, illustrating a step of processing a terminal of the cable.
Figure 4:
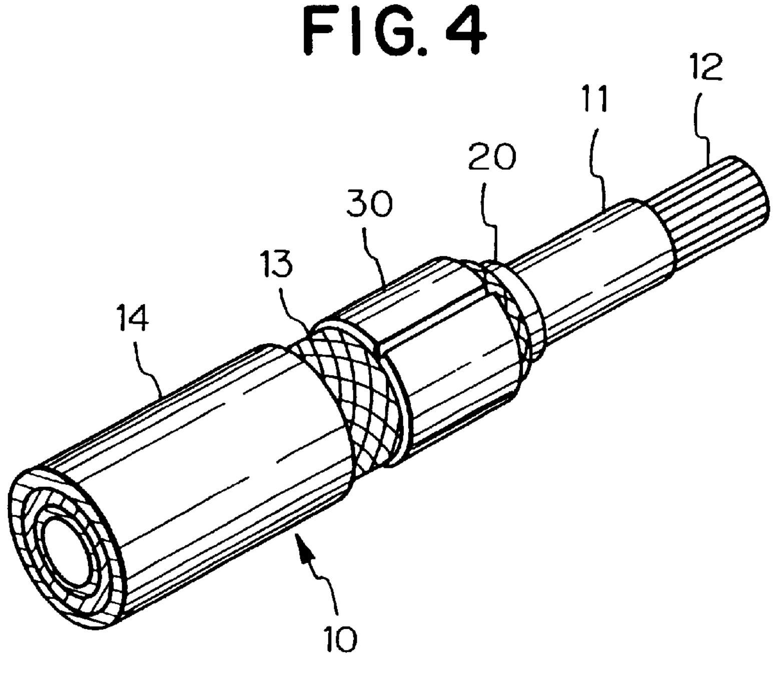
FIG. 4 is a perspective view of a terminal-processed structure of the shielded cable in accordance with the present Invention.

As shown in FIG. 1, the shielded cable 10 is stripped at its one end so that at least a part of the outer jacket is removed to expose the braided metallic wires 13. Then, as shown in FIG. 3, the plastic sleeve 20 is inserted between the first insulating layer or insulating member 11 and the exposed, braided metallic wires 13 . The U-shaped metallic strip 30 is put on the exposed, braided metallic wires 13 and crimped on the wires 13 so that the strip 30 can encircle the wires 13, as shown in FIG. 4.

Figure 7A:
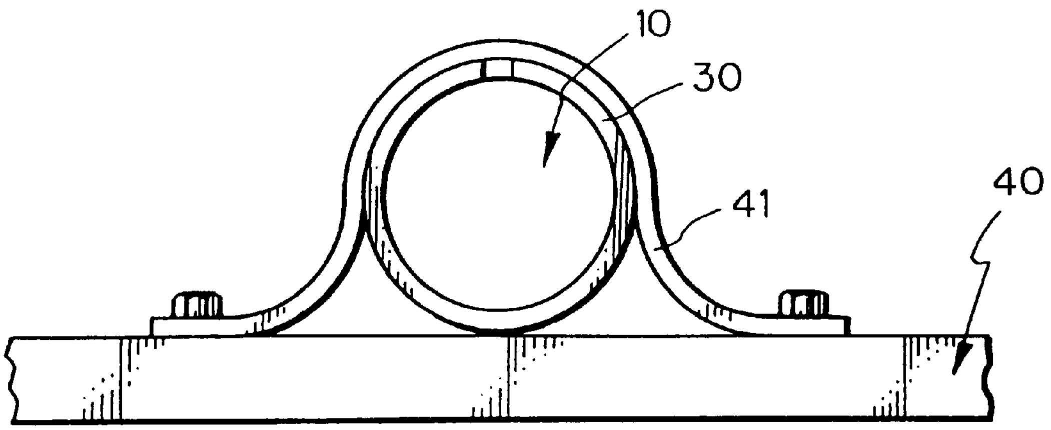
FIGS. 7A and 7B are front views of the terminal-processed structure of the shielded cable of the present Invention, illustrating the respective examples of use of the cable.
Figure 7B:
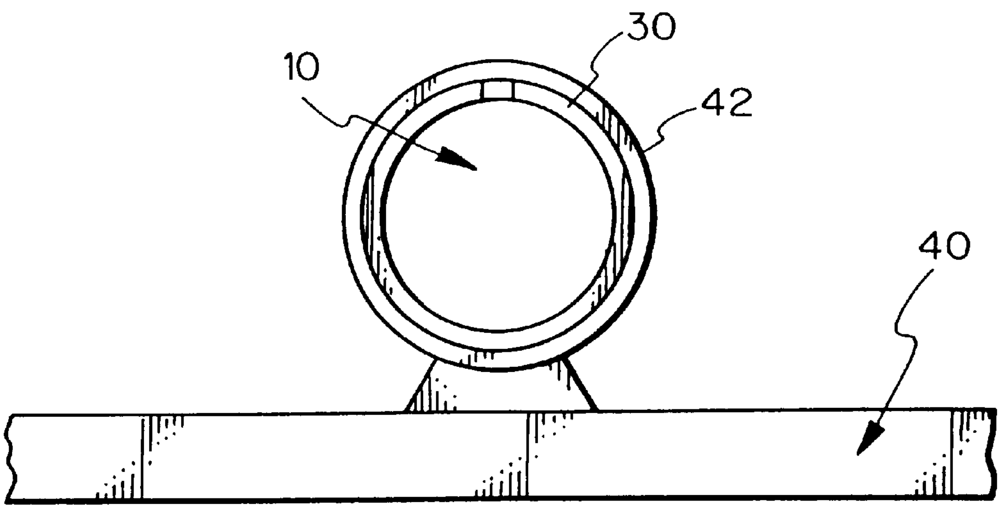
Figure 8:
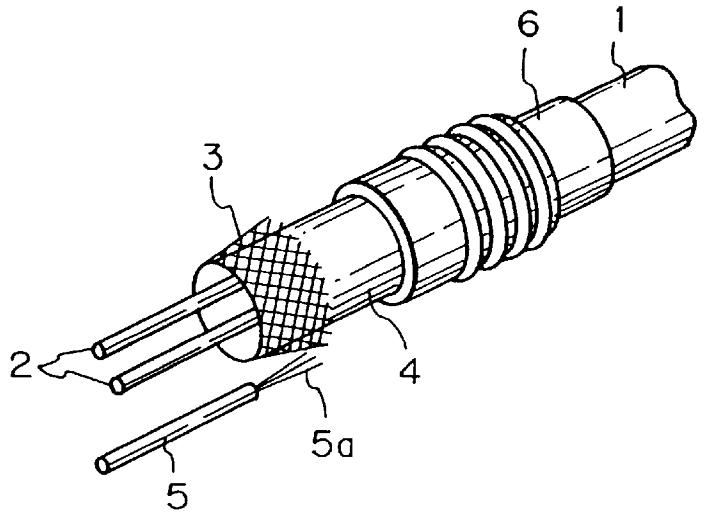
FIG. 8 PRIOR ART
FIGS. 8 to 10 are perspective views of an end of a conventional shielded cable, illustrating the respective steps of processing a terminal of cable.
Figure 9:
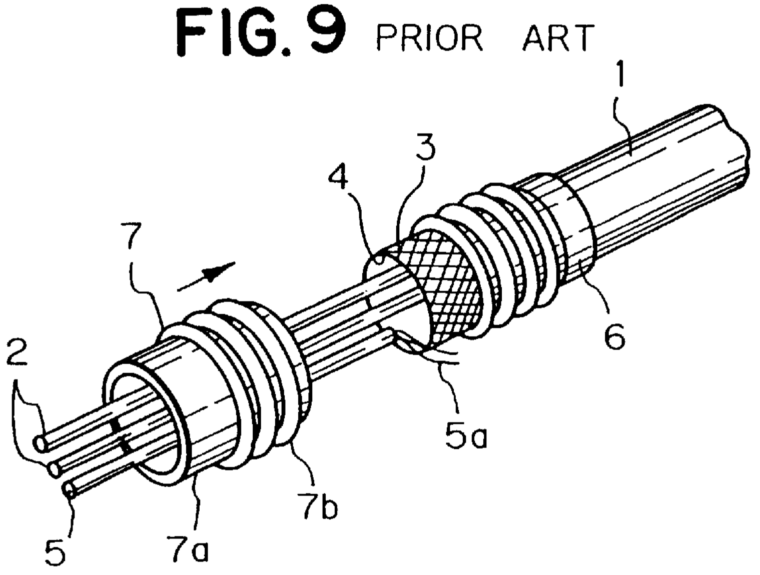
FIG. 9 PRIOR ART
Figure 10:
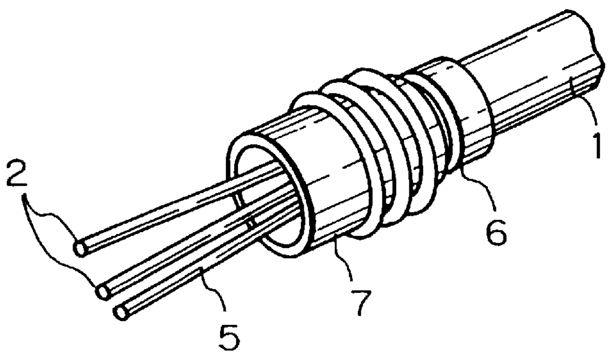
FIG. 10 PRIOR ART

In the case that the shielded cable 10 having such a terminal-processed structure is used in a conductive casing 40, the conductive sleeve-like body 30 may be held on the casing 40 to contact with it, as shown in FIGS. 7A and 7B. In order to maintain an electrical contact between the body 30 and the casing 40, the body 30 crimped on the one end of the shielded cable 10 is attached to the casing 40 by a conductive metallic band 41 (FIG. 7A) or a conductive metallic ring 42 (FIG. 7B). Consequently, it is not necessary to solder the braided metallic wires 13 to the casing 40 or to secure the wires 13 to the casing 40.

Accordingly, it is possible to electrically secure the conductive sleeve-like body 30 to the braided metallic wires 13 by inserting the plastic sleeve 20 beneath the exposed, braided metallic wires 13 so that the sleeve 20 supports the wires 13 and by crimping the metallic strip 30 on the wires 13.

Figure 5:
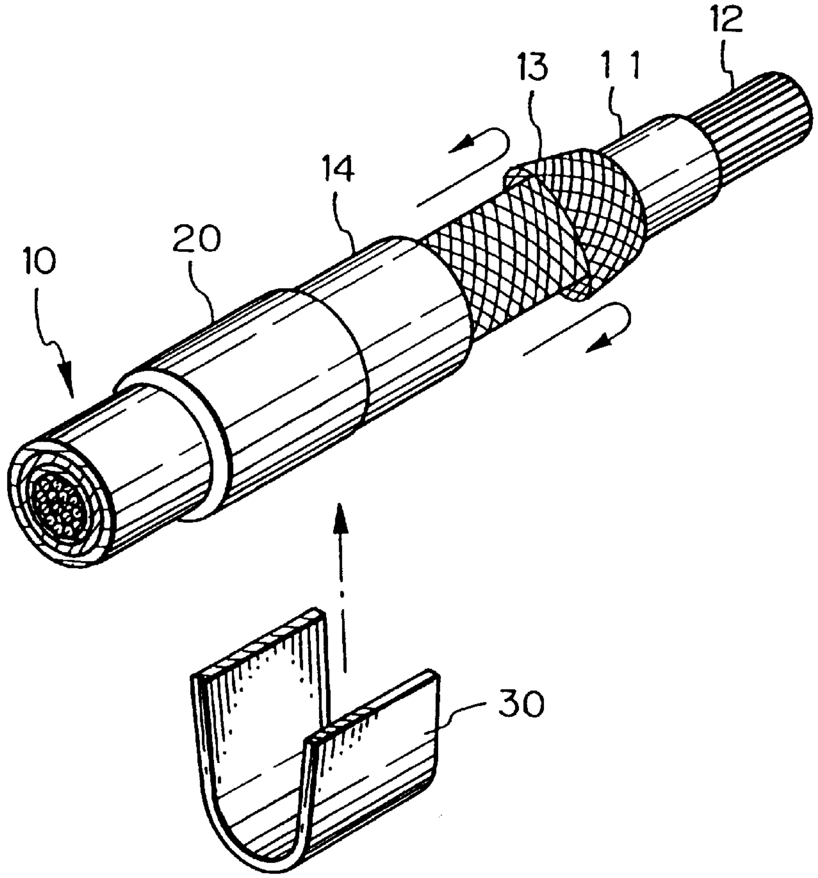
FIG. 5 is a perspective view of an end of the shielded cable, illustrating a step of processing a terminal of the cable in another embodiment of the present Invention.
Figure 6:
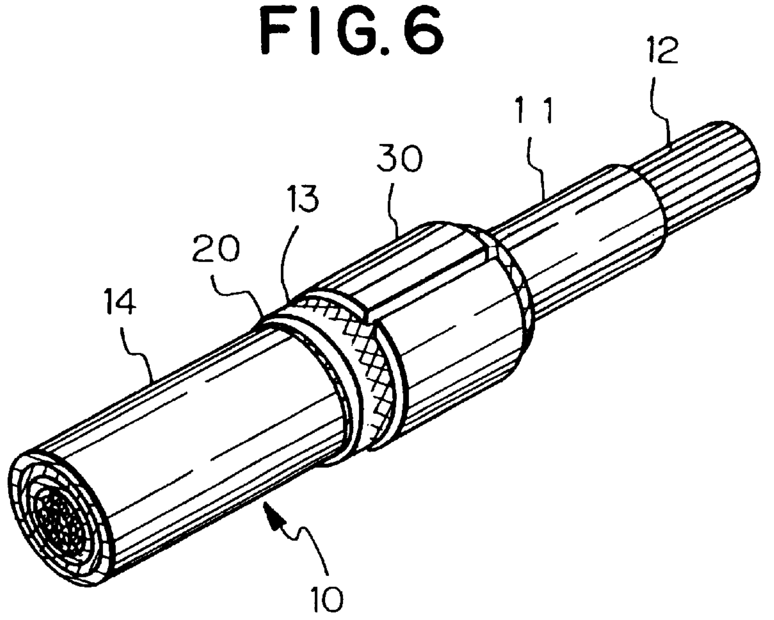
FIG. 6 is a perspective view of a terminal-processed structure of the shielded cable in accordance with the embodiment shown in FIG. 5.

FIGS. 5 and 6 show another embodiment of the terminal-processed structure of the shielded cable in accordance with the present Invention.

In this embodiment, the plastic sleeve 20 has an inner diameter sufficient to receive the second insulating layer or outer jacket 14 on the shielded cable 10. The exposed, braided metallic wires 13 are loosened and bent back on the sleeve 20 after the sleeve is disposed on the outer jacket 14. Then, the metallic strip 30 which has a span slightly larger than the outer diameter of the sleeve 20 is crimped on the metallic wires 13 bent back on the sleeve 20. In this embodiment, it is possible to enlarge the outer diameter of the terminal-processed structure, since the metallic wires 13 are bent back on the sleeve 20.

The sleeve 20 may be altered to the same examples as those described above.

In the present Invention, the shielded cable can be used in the casing in the same manner as those shown in FIGS. 7A and 7B.

Figure 11:
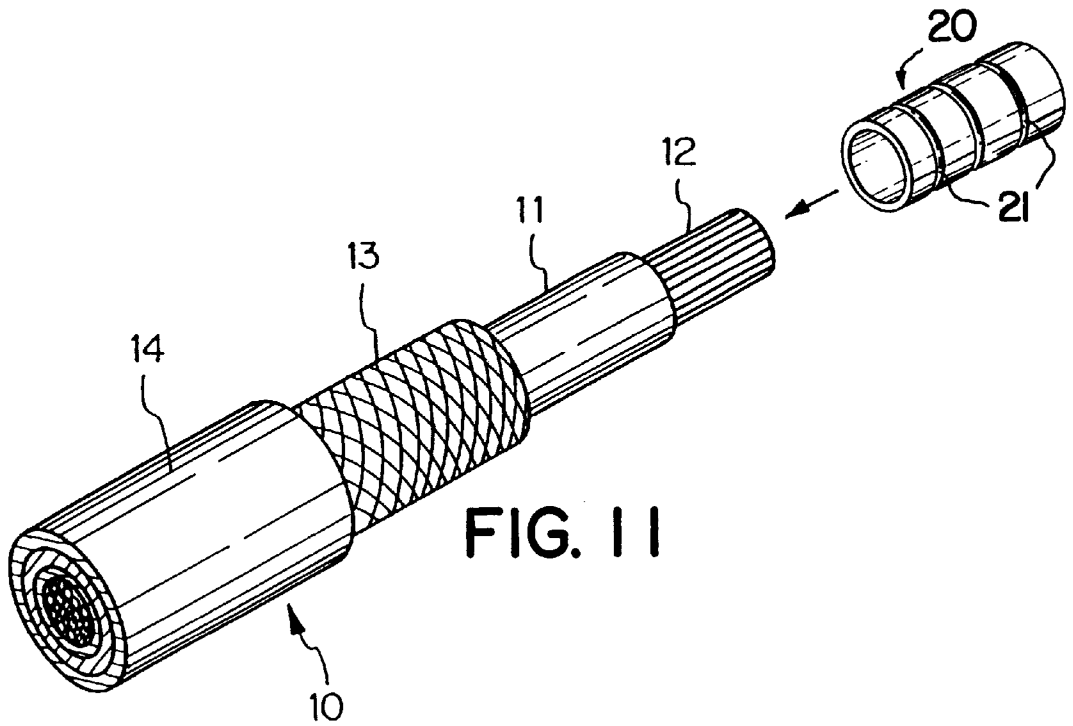
FIG. 11 is a view, similar to that of FIG. 1, of a preferred embodiment of the Invention.
Figure 12A:
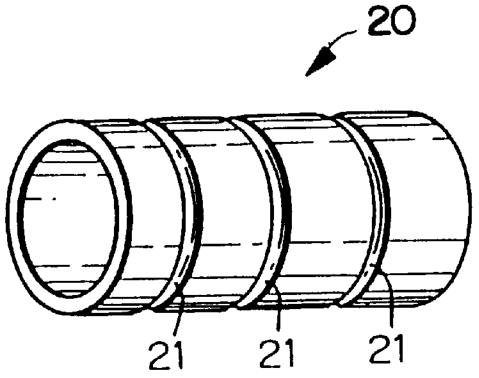
FIGS. 12A to 12C are views, similar to FIGS. 2A, 2C, and 2D, of a preferred embodiment of the Invention.
Figure 12B:
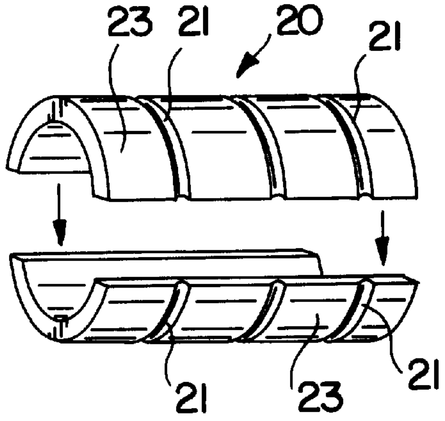
Figure 12C:
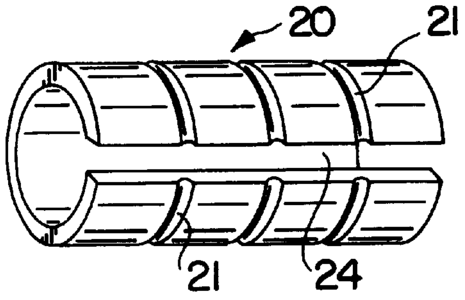

FIGS. 11 and 12 correspond to FIGS. 1 and 2, except that hard sleeve-like body 20 is provided with a plurality of circumferential grooves 21 . These grooves can be parallel and independent of each other or may be in the form of a spiral.

Figure 13:
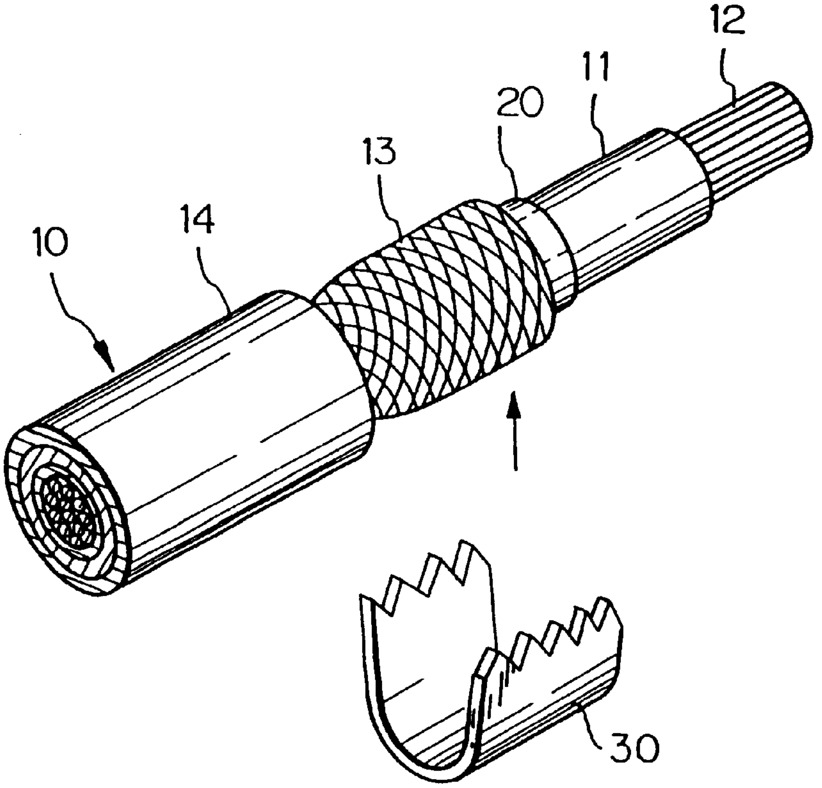
FIGS. 13 and 14 are views, similar to FIGS. 3 and 4, of a preferred embodiment of the Invention.
Figure 14:
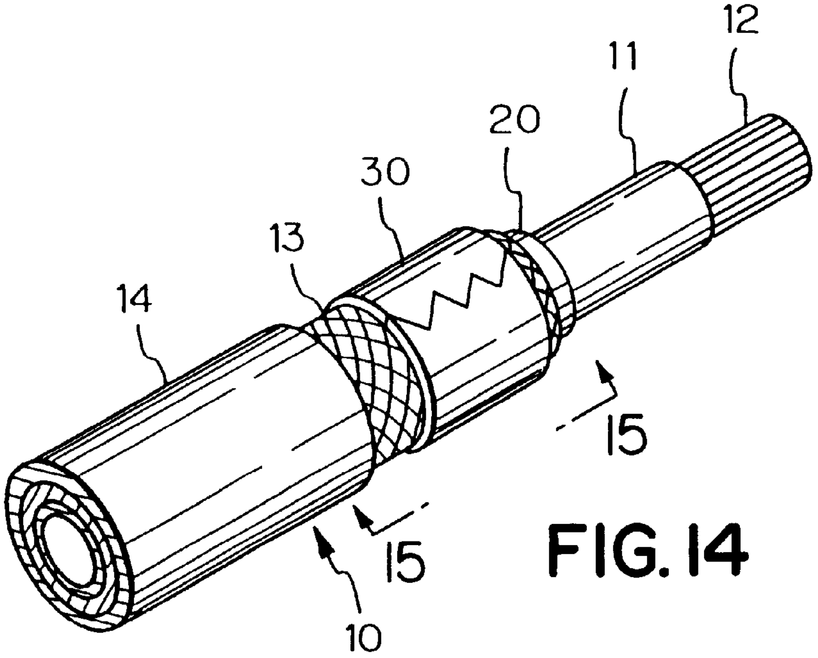

FIGS. 13 and 14 correspond to FIGS. 3 and 4 except that conductive sleeve-like body 30 is provided with serrated edges. After the conductive body has been crimped around braid 13, the two serrated edges complement each other so that the body is held firmly on braid 13 and the edges do not overlap. Therefore, it constitutes only a single layer.

Figure 15:
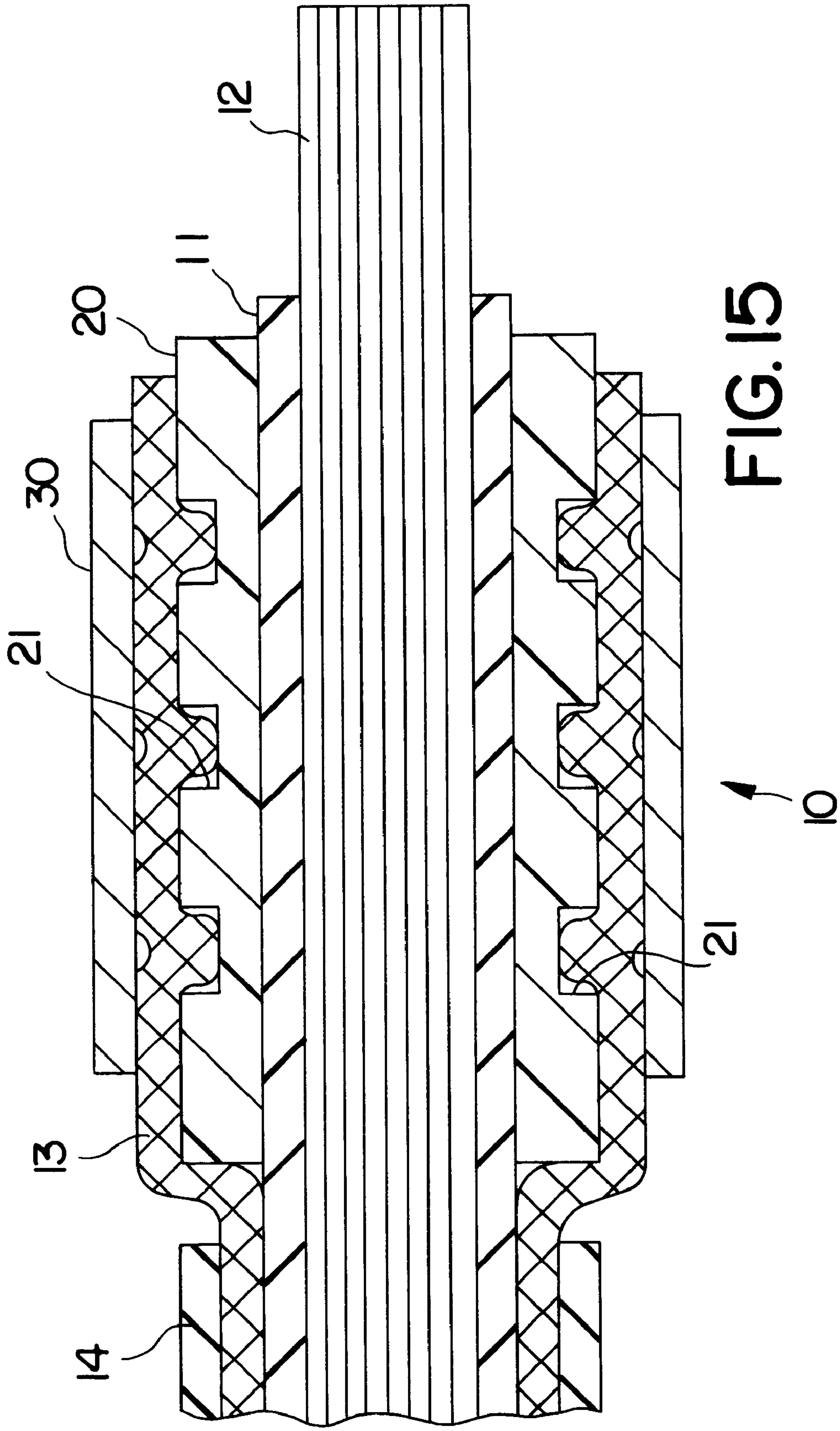
FIG. 15 is a cross section along line 15—15 of FIG. 14.

Moreover, as shown in FIG. 15, braid 13, upon application of conductive body 30, enters grooves 21, thereby securing hard body 20, braid 13, and conductive body 30 to each other.

Figure 16A:
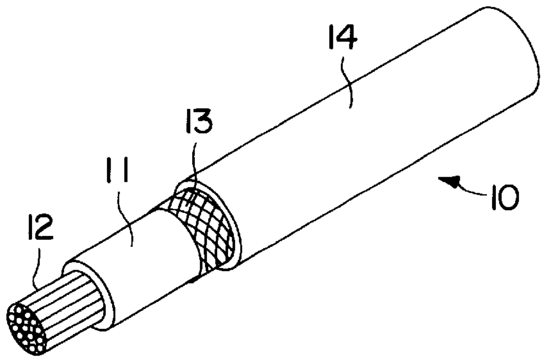
FIGS. 16A through 16D are views, similar to FIGS. 13 and 14, of alternative embodiments of the Invention.
Figure 16B:
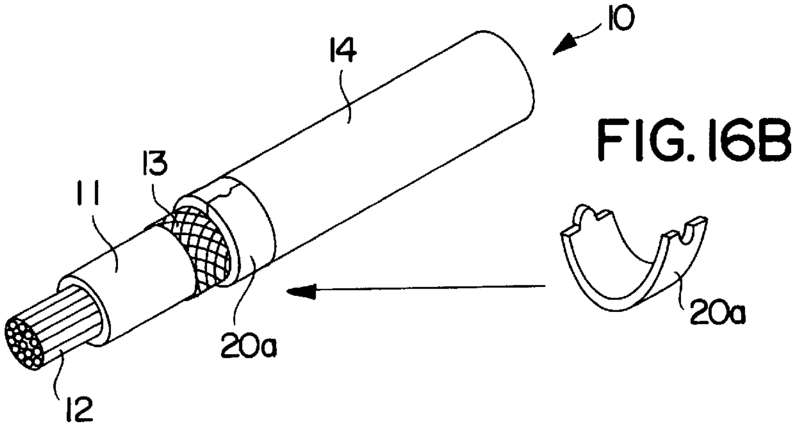
Figure 16C:
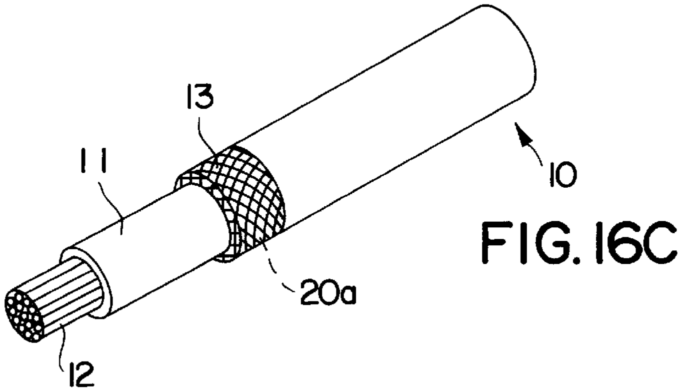
Figure 16D:
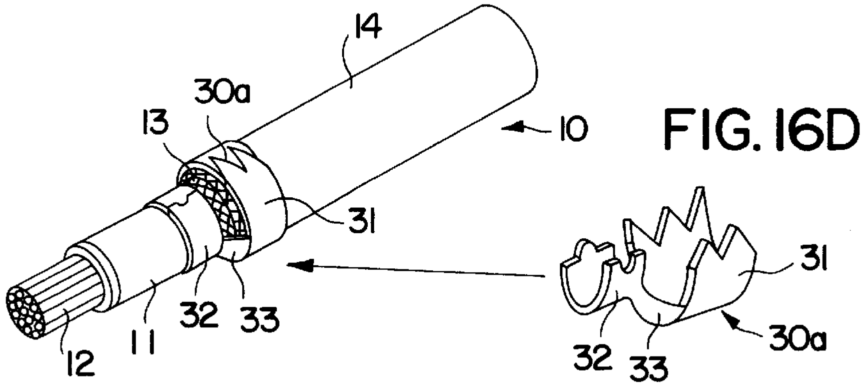
Figure 17A:
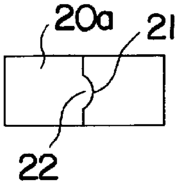
FIGS. 17A through 17D are, respectively, top, side, end and perspective views of the sleeve-like base body 20*a* of FIG. 16B, in said body's crimped configuration.
Figure 17B:
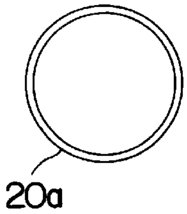
Figure 17C:
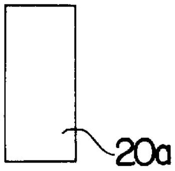
Figure 17D:
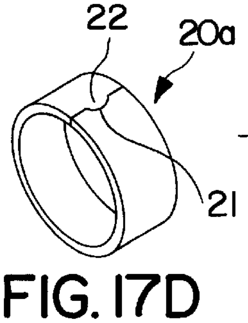
Figure 17E:
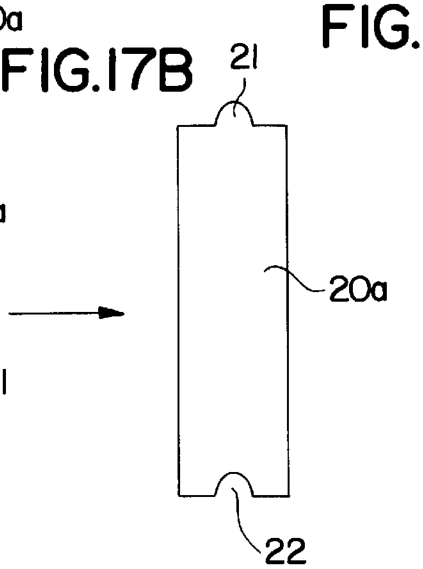
FIG. 17E is a top view of the sleeve-like base body 20*a* of FIG. 16B, in said body's flattened configuration.
Figure 18A:
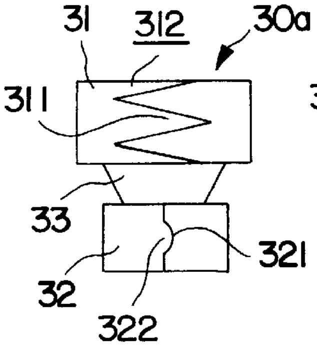
FIGS. 18A through 18D are, respectively, top, side, end and perspective views of the sleeve-like base body 30*a* of FIG. 16D, in said body's crimped configuration.
Figure 18B:
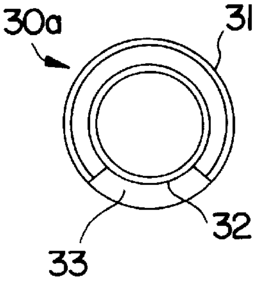
Figure 18C:
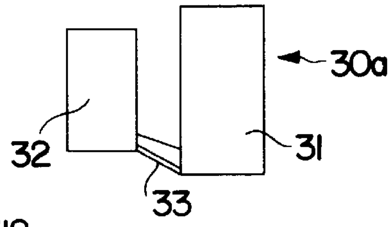
Figure 18D:
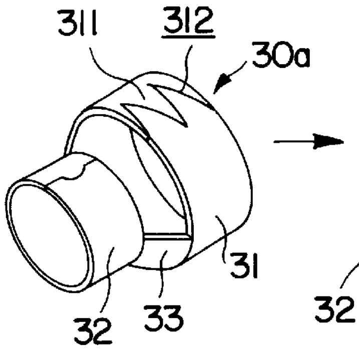
Figure 18E:
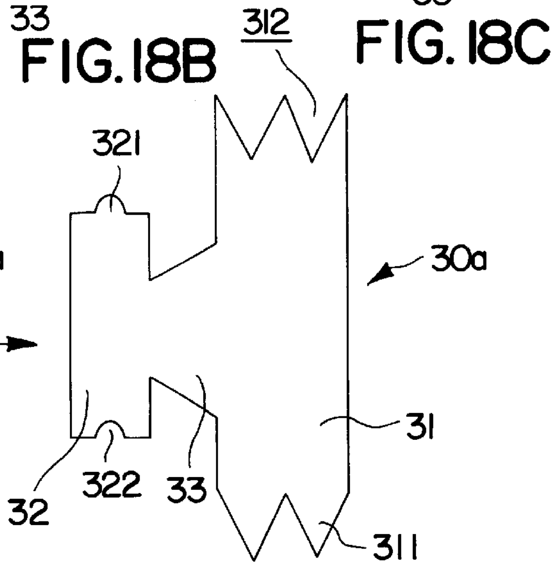
FIG. 18E is a top view of the sleeve-like base body 30*a* of FIG. 16D, in said body's flattened configuration.

An alternative embodiment of the Invention is shown in FIGS. 16A through 16C and 17A through 17E. This is similar to the embodiment shown in FIGS. 13 and 14. In FIG. 16B, a conductive sleeve-like body 20*a* is provided which is a U-shaped strip having complementary opposite end edges 21, 22 (see FIGS. 17A, 17D and 17E). After the conductive body 20*a* has been crimped around braid 13, the two complementary opposite end edges fit together so that the body is held firmly on braid 13 and the edges do not overlap. Therefore, it constitutes only a single layer. Various views of body 20*a* are shown in its uncrimped (flat) position in FIG. 17E and in its crimped position in FIGS. 17A through 17D.

Yet another alternative embodiment of the Invention is shown in FIGS. 16D and 18A through 18E. This is similar in some ways to the embodiment shown in FIGS. 13 and 14 in that a conductive sleeve-like body assembly 30*a* is provided. Assembly 30*a* is, however, different from body 20*a* (FIG. 16B). In particular, assembly 30*a* has a first sleeve-like body 31 having a relatively large diameter in its crimped position (FIGS. 18A–D), a second sleeve-like body 32 having a relatively small diameter in its crimped position, and a bridge member 33 for interconnecting said first and second sleeve-like bodies 31 and 32. The opposite end edges (311, 312 and 321, 322, respectively) of bodies 31 and 32 are complementary to each other. After the conductive assembly 30*a* has been crimped around braid 13 and first insulating layer 11, the two pairs of complementary opposite end edges fit together so that the assembly is held firmly on braid 13 and layer 11, and the edges do not overlap. Various views of body assembly 30*a* are shown in its uncrimped (flat) position in FIG. 18E and in its crimped position in FIGS. 18A through 18D.

While only a limited number of specific embodiments of the present Invention have been expressly described, it is, nonetheless, to be broadly construed and not to be limited except by the character of the claims appended hereto.

What is claimed is:

1. A terminal-processed structure for a shielded cable, wherein said cable includes core wires surrounded by a first insulating layer, said first layer being sheathed in braided metallic wires, and a second insulating layer surrounding said braided wires, said braided wires being exposed at one end of said cable, comprising:

a conductive sleeve-like body (20*a*) crimped on said second insulating layer and said exposed, braided metallic wires, being bent back above said sleeve-like body, said sleeve-like body being a U-shaped strip having complementary, opposite end edges when said body is placed on said second insulating layer on the one end of said shielded cable, said opposite end edges of said body being complementary to each other when said strip is crimped onto said second insulating layer, and a conductive sleeve-like body assembly including a first sleeve-like body having a relatively large diameter, a second sleeve-like body having a relatively small diameter, and a bridge member for interconnecting said first and second sleeve-like bodies and, said first sleeve-like body being crimped on said exposed, braided metallic wires which are bent back above said conductive sleeve-like body (20*a*) to hold said metallic wires between said first sleeve-like body and the conductive sleeve-like body and provide electrical contact therebetween, said second sleeve-like body being crimped on an exposed first insulating layer from which said braided metallic wires are stripped to hold said assembly onto said cable, said first and second sleeve-like bodies being U-shaped metallic strips having irregular opposite end edges and complementary opposite end edges when said bodies are placed on the exposed, braided metallic wires which are bent back above conductive said sleeve-like body (20*a*) and said first insulating layer from which said braided metallic wires are stripped, said conductive sleeve-like body assembly being formed from a single conductive metallic sheet, said respective opposite end of said first and second bodies being complementary to each other when said strips are crimped onto said metallic wires and first layer.

2. A terminal-processed structure of a shielded cable according to claim 1 wherein said one end is in a conductive casing, and a conductor electrically connecting said conductive sleeve-like body assembly with said casing.

3. A method of processing a terminal of a shielded cable, wherein core wires covered by a first insulating layer are sheathed by braided metallic wires on the outer periphery thereof and are further covered by a second insulating layer on the braided metallic wires, said method comprising the steps of:

exposing said braided metallic wires at one end of said shielded cable;

placing a conductive sleeve-like body (20*a*) made of a U-shaped strip having complementary opposite end edges on said second insulating layer at one end of said cable;

crimping said strip of said body (20*a*) onto said second insulating layer with said opposite end edges of said body being complementary to each other, bending back said exposed, braided metallic wires above said crimped sleeve-like body;

placing on the one end of said cable a conductive sleeve-like body assembly including a first sleeve-like body having a relatively large diameter, a second sleeve-like body having a relatively small diameter, and a bridge member for interconnecting said first and second sleeve-like bodies, crimping said first sleeve-like body on said exposed, braided metallic wires bent back above said crimped sleeve-like body (20*a*) to hold said metallic wires between said first sleeve-like body and the conductive sleeve-like body and provide electrical contact therebetween, and crimping said second sleeve-like body on said exposed first insulating layer from which said braided metallic wires are stripped to hold said assembly onto said cable, said first and second sleeve-like bodies being U-shaped metallic strips having irregular opposite end edges and complementary opposite end edges when said bodies are placed on the exposed, braided metallic wires which are bent back above said crimped sleeve-like body (20*a*) and said first insulating layer from which said braided metallic wires are stripped, said conductive sleeve-like body assembly being formed from a single conductive metallic sheet, with said respective opposite end edges of said first and second bodies being complementary to each other when said strips are crimped onto said metallic wires and first layer; and attaching said second sleeve-like body to a casing conductive by a conductor.

* * * * *